No. 612,060. Patented Oct. 11, 1898.
P. G. RUSSELL.
MACHINE FOR MAKING MATCHES.
(Application filed June 7, 1895. Renewed Nov. 4, 1897.)
(No Model.) 3 Sheets—Sheet 2.
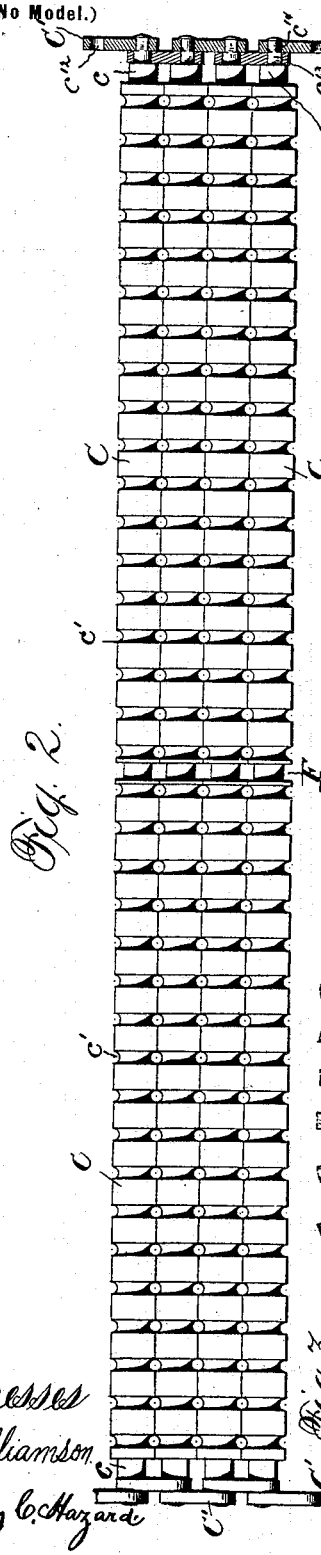
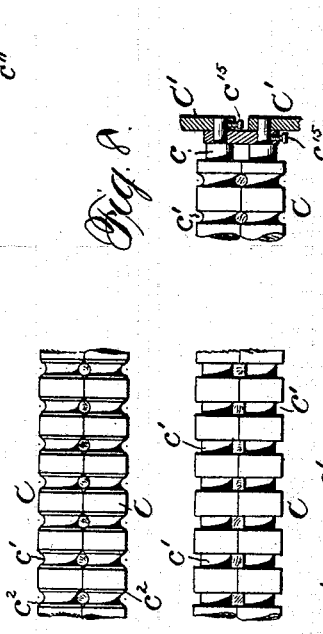
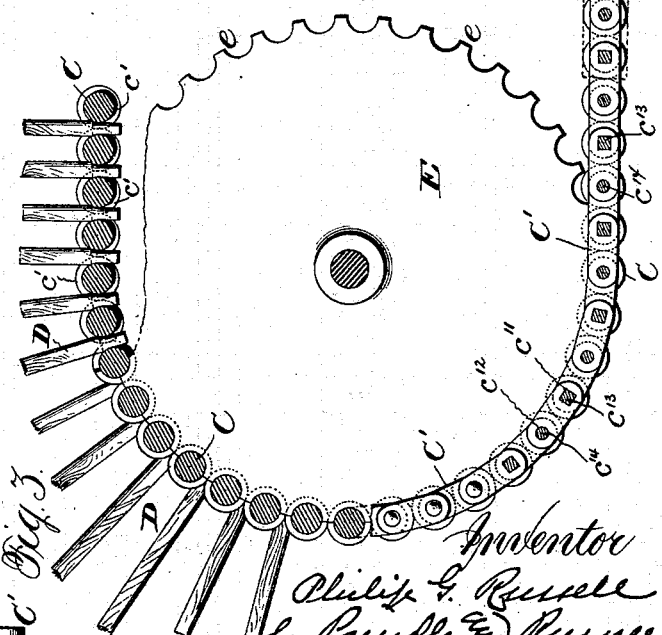

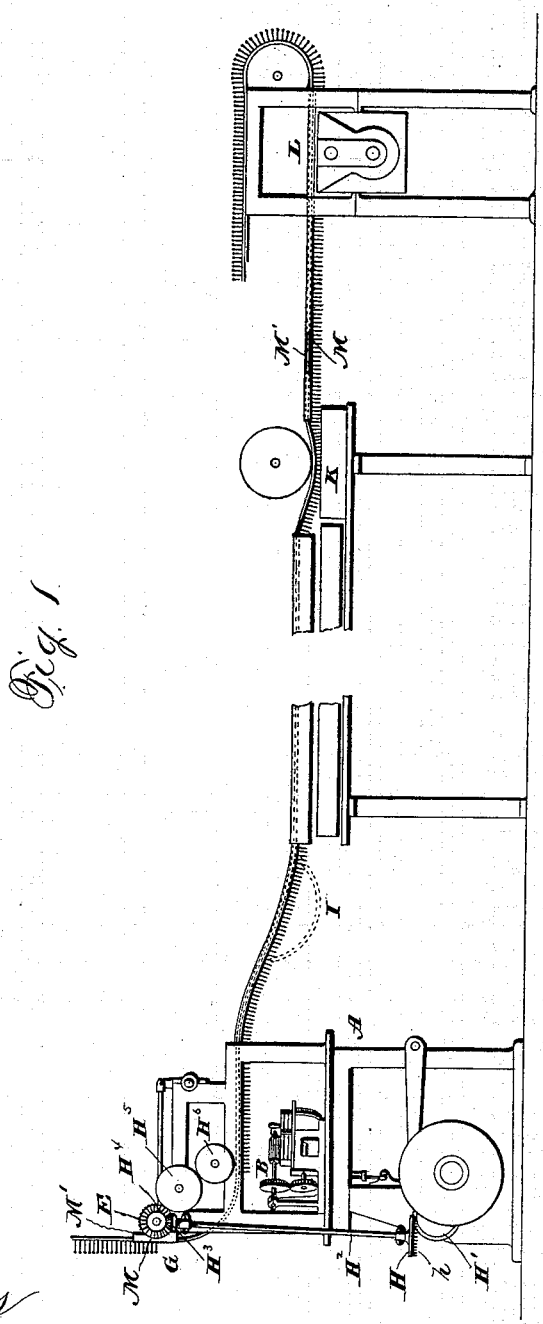

No. 612,060. Patented Oct. 11, 1898.
P. G. RUSSELL.
MACHINE FOR MAKING MATCHES.
(Application filed June 7, 1895. Renewed Nov. 4, 1897.)
(No Model.) 3 Sheets—Sheet 3.

Witnesses
C. J. Williamson
Henry C. Hazard

Inventor
Philip G. Russell
by Prindle and Russell
his attorneys

United States Patent Office.

PHILIP G. RUSSELL, OF WASHINGTON, DISTRICT OF COLUMBIA, ASSIGNOR TO THE DIAMOND MATCH COMPANY, OF CHICAGO, ILLINOIS.

MACHINE FOR MAKING MATCHES.

SPECIFICATION forming part of Letters Patent No. 612,060, dated October 11, 1898.

Application filed June 7, 1895. Renewed November 4, 1897. Serial No. 657,424. (No model.)

*To all whom it may concern:*

Be it known that I, PHILIP G. RUSSELL, of Washington city, in the District of Columbia, have invented certain new and useful Improvements in Machines for Making Matches; and I do hereby declare that the following is a full, clear, and exact description thereof, reference being had to the accompanying drawings, in which—

Figure 9:
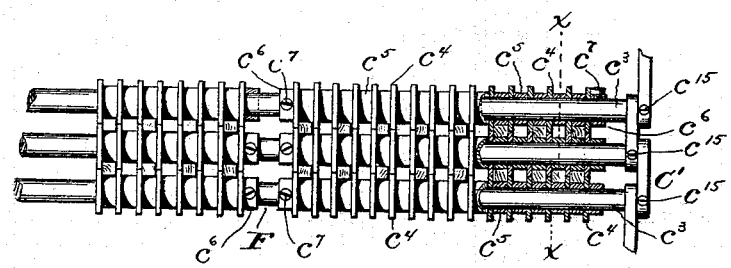
Figure 10:
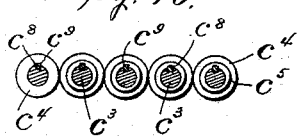
Figure 11:
Figure 12:
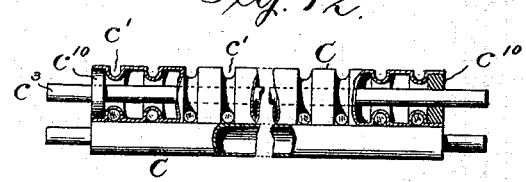
Figure 13:
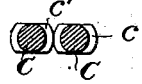

Figure 1 shows in side elevation a machine in which my improved carrier-chain is employed; Fig. 2, a view, mainly in plan, but partly in section, of a portion of the carrier on an enlarged scale; Fig. 3, a detail view, on an enlarged scale, showing one of the carrier-chain supporting and driving wheels in side elevation and portions of the chain in section on different lines, so as to show the form and construction of the different parts going to make up the chain; Figs. 4, 5, 6, and 7, detail views showing the bars on the same scale as those in Fig. 2, provided with different forms of splint receiving and holding grooves; Fig. 8, a view, partly in plan and partly in section, showing another form of means for connecting the bars with the links; Fig. 9, a detail view, partly in plan and partly in section, of another form of my splint-holding bars; Fig. 10, a view of a section on line $x\, x$ of Fig. 9; Fig. 11, a similar view showing the shafts for supporting the rings, of which the built-up bars of Fig. 9 are made square to fit correspondingly-shaped openings in the rings of which the bodies of the bars are made; Fig. 12, a detail view showing, partly in plan and partly in section, adjoining splint-holding bars made hollow; Fig. 13, a detail view showing a cross-section of two of the splint-holding bars with their upper and lower portions cut away for the sake of lightness.

Like letters refer to like parts in each of the figures.

The object of my invention is to provide an improved match-making machine; and to this end my invention consists in the machine and in the parts thereof constructed, arranged, and combined as hereinafter specified.

In the drawings, A designates the frame of the machine, which can be of any desired material and of any form suitable for the support of the various operative parts, and B designates the mechanism for inserting the splints in the carrier to be described. While this mechanism can be of any desired form and construction without departure from my invention, I prefer to have it like that fully shown and described in the United States patent to Beecher and Wright, No. 528,457, which is adapted to cut the splints from blocks of wood fed to it and stick them in the splint receiving and holding parts of the carrier-chain. As the construction and operation of this part of the machine are fully shown and described in that patent, I need not describe or show them more at length herein, but will refer to the patent for a complete specific setting forth of them.

Instead of forming my carrier-chain of a series of plates linked together and having rows of perforations to receive the splints from the sticking devices I use a series of bars C C, having the projecting end portions $c\, c$ connected together by links C' C', so as to form a broad continuous flexible apron or chain adapted to pass easily over and under the supporting and moving devices employed to support and drive it along throughout the machine and back to the sticking devices again. The bars thus connected are adapted to receive and hold between them portions of the splints D D to be treated, so as to carry the same along and present their lower ends properly to the treating mechanisms employed to make the splints into complete matches.

Instead of making the bars in the form of simple plane cylinders to engage only the forward and rear sides of the splints—a construction which affords no support for the splints to keep them from swinging to one side or the other to get out of the desirable position for them at right angles to the bars— I provide them with grooves, which so receive the splints that their sides effectually keep the splints from the described swinging out of position during the travel of the carrier-chain.

In the form of my carrier-chain shown in Figs. 2, 3, and 8 the bars C C, which are round, are provided with circumferential grooves $c'$ $c'$, rounded in cross-section, so as to be well adapted for receiving and holding portions of round splints thrust up between the bars. The corresponding grooves in adjoining bars are arranged to come exactly opposite each other and are so situated on the bars that when by the travel of the carrier-chain the middle line between two adjoining bars is brought over the splint-sticking mechanism at B the spaces inclosed by the opposing grooves will stand in position to receive the respective splints thrust upward by such mechanism. The grooves are made of such size as to cause compression of the inserted splint ends enough to give the bars a firm grip upon the splints. With the grooves thus made to inclose and grip a portion of the splints fed up between neighboring bars the splints will not only be very securely held against falling down and out from between the bars, but will be prevented by the sides of the grooves from swinging to one side or the other, so as to stand at an angle other than a right angle to the bars and the face of the carrier-chain. The splints in the grooves of any two bars will then be held properly spaced apart and standing exactly parallel to each other during the travel of the carrier-chain until they are discharged from the latter by the discharging device to be described. The grooves of the bars shown in Fig. 4 are of a different shape, though still adapted especially to receive and hold rounded splints. The outer portions of the sides of such grooves are cut away or beveled off, as indicated at $c^2$ $c^2$, in order that the openings presented for the entrance of the splints from the sticking mechanism may have a downward flare in all directions to facilitate the entrance of the splint ends, just as do the countersinks in the perforated plates of the carrier-chain in the patent hereinbefore referred to.

Where splints square or rectangular in cross-section are to be operated upon, I make the grooves $c'$ $c'$ of the shape shown in either Fig. 5, 6, or 7. Those in the bars of Fig. 5 are rectangular in cross-section and are to be of such size with reference to the splints as to compress those portions of the latter which are thrust up between the bars enough to give a firm steadying hold upon them. The abrupt sides of the grooves engaging the splint sides most effectually prevent any swinging of the splints out of their required positions parallel to each other.

In the form of bars shown in Fig. 7 the grooves are made wide enough to allow the splints to pass easily between their sides without compression, such sides being intended to merely act as steadiers for the splints and not to perform any of the gripping of the latter. The hold upon the splints in this case is due to the engagement of the bottoms of opposing grooves with the opposite sides of the splints.

In Fig. 6 the angular grooves are shown with the outer portions of their sides cut away or beveled, so as to make the lower sides of the openings presented to the splints in the sticking mechanism flaring in all directions to secure the easy entrance of the splint ends.

In Fig. 9 I show several of the carrier-chain bars built up instead of being made in one piece, with grooves cut or otherwise formed in them, as in the bars already described, and shown in the preceding figures of the drawings. These built-up bars are readily formed of shafts $c^3$ $c^3$, whose outer ends correspond with the parts of the other bars which are engaged and connected together by the links C' and a series of rings $c^4$ $c^5$ of different diameters fixed upon the shafts, so as to leave splint receiving and holding spaces corresponding with the grooves of the other bars. The rings $c^4$ are of such diameter that the peripheries of those on one shaft come close to those of the rings on the other shaft, while the rings $c^5$ are made of a smaller diameter, being large enough to cause a gripping of a splint thrust up between those on two adjoining shafts. The width of those rings $c^5$ which are to engage the splints and form the bottoms of the splint-receiving grooves is such as to cause the rings $c^4$ on opposite sides of them to engage the sides of the splints to secure the same steadying hold upon the splints as is obtained by the grooves of the other bars hereinbefore described. The series of rings on any shaft $c^3$ can be held in place on the latter by clamping-rings $c^6$ $c^6$, secured by set-screws $c^7$ or any other desired form of fastening. To keep the rings from rotating on the shaft, they can be provided with offsets $c^8$ to engage a key $c^9$, carried by the shaft, as indicated in Fig. 10, or the shaft can be made angular in cross-section to fit correspondingly-shaped openings in the rings, as shown in Fig. 11.

For the sake of lightness I prefer to make the bars which are not built up hollow, as indicated in Fig. 12. In such figure one of the adjoining bars is shown as consisting of a thin tube corrugated at $c'$ $c'$ to form the splint-receiving grooves. At its ends and at other points, if desired, this tube is supported from the shaft $c^3$ by rings $c^{10}$ $c^{10}$, surrounding the latter. Of the two bars shown one only is grooved, the other having a plane convex periphery to engage the sides of the splints opposite to those engaged by the bottoms of the grooves.

To secure the desired steady holding of the splints against swinging toward one end or the other of the bars, the grooves $c'$ $c'$ are made deeper than where both of two adjoining bars are grooved. While I have shown this grooved and plane bar arrangement only in the hollow bars of Fig. 12, I contemplate using it also where desired with the solid bars of the other figures hereinbefore described.

Where either solid, made-up, or tubular bars are used, they may for the sake of lightness have their upper and lower portions removed, so that they will have in cross-section the shape which is shown in Fig. 13.

With the form of link connection between adjoining bars which I prefer the bars can only have a rocking motion as the carrier-chain passes around a supporting wheel or guide or changes its direction of travel and cannot be rotated beyond the extent necessary to allow the carrier-chain to be flexed. The amount of flexing which is required is not enough to bring the flattened parts of the bars opposite each other or to vary the extent of the part of any splint engaged and held by the grooves.

To prevent rotation of the bars beyond a given point as the carrier-chain is moved along by the moving and supporting devices, I attach one end of each link C' to one of the bars, so that such bar cannot rotate with reference to the link, and connect the other link pivotally with the shaft or projecting axle of the next adjoining bar. This second bar is connected with a second link, so as to be incapable of rotation with reference to it, and the farther end of the link is pivotally connected with the next bar in the same way that the first link was with the second bar.

In the form of carrier-chain shown in Figs. 2 and 3 I secure the above-indicated desirable connection of the bars and links by having each link provided at or near its opposite ends with angular and round holes $c^{11}$ and $c^{12}$, respectively, to receive angular and rounded portions of the shafts or axles of the adjoining bars. The construction is such that each of such shafts or axles has an angular portion $c^{13}$ and a rounded part $c^{14}$. The axle of one bar has its angular part next the end of the bar engaged by the angular opening in a link, and the axle of the adjoining bar has next the bar end a round part journaled in the round opening in the other end of the link. The outer portion of the axle of the second of these bars is made angular to fit the angular opening in another link, which at its other end has a round opening engaged by the rounded outer part of the shaft or axle of a third bar. This third bar is connected with the next succeeding or fourth bar just as is the first bar with the second, above described.

In Figs. 8 and 9 is indicated another way of securing and pivoting the links to adjoining bars. In this form of my carrier-chain the projecting shafts or axles of the bars are all round, the links having correspondingly-shaped holes to engage them. The desired securing of one end of each link to the bar at that end is obtained by a set-screw $c^{15}$, tapped through the link and engaging the bar shaft or axle.

For supporting and moving the carrier-chain along I provide the wheels E E, having teeth $e\ e$ to receive and engage portions of the bars C C at any desired points in the travel of the carrier-chain. If desired, these wheels can be arranged not only so as to engage portions of the bars close to the links on opposite sides of the chain, but also at different points along the bars, as at the points indicated by F in Figs. 2 and 9. These wheels wherever situated are to be supported and driven in any desired way. The carrier-wheels E E, situated where the carrier-chain passes [the discharging device G, and the splint cutting and sticking mechanisms are given a step-by-step rotation by mechanism like that fully shown and described in the pending application of Beecher and Wright, Serial No. 542,507, such mechanism consisting of a disk H, provided with pins $h\ h$ to engage a rotating cam H', a shaft $H^2$, to which the disk is attached, a bevel-pinion $H^3$ on such shaft engaging bevel-gear $H^4$, attached to and rotating with the shaft of the carrier-wheels E E, which engage the carrier-chain close to the discharging device, and a gear $H^5$, rotating with gear $H^4$ and meshing with gear $H^6$ (which in turn meshes with gear $H^5$) on the shaft of the carrier-wheels, engaging the carrier-chain close to the splint cutting and sticking mechanism. The other carrying and supporting wheels may be given a step-by-step rotation through suitable gearing connected with that described or, without departure from my invention, could be rotated continuously by any suitable connections between them and a driving-shaft. In the latter case the carrier-chain could be provided with a slack portion at I, (shown by dotted lines in Fig. 1,) as and for the same purpose as the slack part in the carrier-chain of the application referred to.

I do not limit myself to any particular form of means for driving the carrier-wheels E E, as my present invention has nothing to do with such part or parts of the machine, which can be varied in construction as desired without involving any departure from my invention.

From the splint cutting and sticking mechanism the carrier-chain passes to the paraffining device, (indicated at K,) where the splints carried by it are treated with paraffin. Beyond this is the composition-applying device, (indicated at L,) which can be of any desired construction adapted to apply portions of igniting composition to the lower ends of the splints, which are moved along by the carrier-chain. As the latter passes the composition-applier it is desirable that the splints should move along in a horizontal path while being held exactly vertical. To secure this, I provide guides M M, upon which the links C' C' rest, and also other guides M' M', which engage the upper sides of the links and hold them down, so that they must travel along in a straight line and will remain in a horizontal position or in line with the travel of the chain. With the links thus held and guided the bars C C, holding the splints, will be kept from rising and from any rotation with reference to each other, so that the splints will have their lower ends always presented to the composition-applying device at the same height and in precisely the same way, so as to secure uniformity in the portion of composition applied, and consequently in the size of the match-heads.

Where the flattened form of bar shown in Fig. 13 is used, guides can be arranged to engage the upper and lower flat sides at or near the bar ends, so as to hold the bars, with such sides parallel with the plane of travel of the bars, over the composition-applying device. After leaving such device the carrier-chain passes up over a pair of wheels, preferably shaped like the carrier-wheels E E, described hereinbefore, having their peripheries notched to receive portions of the bars. From these wheels it passes on back over any desired form of supports and finally descends between guides M M' in front of the discharging device N, which punches the completed matches out from between the bars. This discharging device I prefer to make like that shown and described in the patent hereinbefore referred to, consisting of a reciprocating head carrying a series of punches to engage the butt-ends of the match-splints and push them outward from between the bars C C each time that the carrier-chain comes to rest with a row of splints in front of the punches. As the construction of this discharging device does not form part of my present invention, I need not show or describe it more in detail, but would refer for full explanation of its structure and operation to the patent referred to.

While the splint-holding bars made in accordance with my invention may be journaled in the links, so as to be rotatable without limit, I prefer to connect them with the links in the manner set forth, so that their rotation is limited. Were they merely journaled in the links so as to be freely rotatable they might, during the travel of the carrier-chain over and around the wheels and guides, be rotated so as to cause some rows of splints either to be raised above the others or dropped out.

With my arrangement and manner of connecting the bars with the links the bars are left free to rotate slightly with reference to each other, as the carrier-chain changes its direction or passes around any guiding or driving wheels and then are brought back to their original positions, when the travel of the carrier-chain becomes straight again.

With the surfaces of the bars which engage the forward and rear sides of the splints made convex with a curvature concentric to the swing of the links pivotally connected with them the grip upon the splints will be neither lessened nor increased, as the carrier-chain changes its direction and the outer or head-receiving ends of the splints will always stand at the same height as they pass any given point in the travel of the carrier.

My carrier-chain, made as shown and described, is simple and cheap in construction and affords certain and effective means for receiving and holding the match-splints securely in their desired positions with reference to each other and presenting them properly spaced apart to the various treating devices for making them into completed matches.

I do not claim or intend to cover by my claims herein, broadly, a splint-carrying chain of linked bars in which some or all of the bars have their surfaces merely knurled or roughened to bite into the splints.

Having thus described my invention, what I claim is—

1. In a match-making machine, in combination with means for supplying the splints, a carrier-chain consisting of bars linked together, between which the splints are thrust, having convex surfaces to engage the forward and rear sides of the splints, and projecting portions on opposite sides of such convex surfaces to engage the splints, such portions having their faces on opposite sides of the splints, in planes substantially at right angles to the axes of the bars, substantially as and for the purpose shown.

2. In a match-making machine, in combination with means for supplying the splints, a carrier-chain consisting of bars linked together and having their opposing faces rounded and provided with grooves extending in planes substantially at right angles to the bars to receive and inclose portions of the splints thrust between the bars, substantially as and for the purpose set forth.

3. In a splint-carrying chain for match-making machines, two bars between which the splints are to be thrust, having convex portions to engage the front and rear sides of the splints, one of such bars having ribs or projecting portions to inclose parts of the splints between them, such ribs extending in planes substantially at right angles to the axes of curvature of the convex portions of the bars, in combination with links connecting the bars, substantially as and for the purpose described.

4. In a splint-carrying chain for match-making machines, in combination with two bars between which the splints are to be thrust, having their opposing sides convex, and provided with splint-receiving grooves extending in planes substantially at right angles to the bars, links connecting the bars together, substantially as and for the purpose specified.

5. In a splint-carrying chain for match-making machines, in combination with a series of bars, between which the splints are to be thrust, having their opposite faces rounded and provided with grooves to receive and partly inclose the splints, links for connecting the bars together, and means whereby each link is connected with one bar, so as to turn with the same, and pivotally connected with an adjoining one, substantially as and for the purpose shown.

6. In a splint-carrying chain for match-making machines, in combination with the series of splint-holding bars having their opposite faces rounded and provided with splint-receiving grooves, the links for connecting the bars together, of which each one is connected with one bar so that the latter cannot rotate with reference to it, and pivotally connected with an adjoining bar, and suitable guides to engage the links, substantially as and for the purpose set forth.

7. In a splint-carrying chain for match-making machines, in combination with the series of splint-holding bars provided with convex surfaces to engage portions of the splints thrust between them, links connecting the bars together so that one bar can rotate, with reference to the adjoining one, and means for preventing rotation of the bars during a portion of the travel of the carrier-chain, substantially as and for the purpose described.

8. In a splint-carrying chain for match-making machines, in combination with the bars made capable of rotation with reference to each other and having convex splint-engaging surfaces between which the splints are to be inserted and held, and connections between the bars, whereby the latter are caused to rotate a uniform extent with reference to each other, as the carrier-chain changes its direction, substantially as and for the purpose specified.

9. In a carrier-chain for match-splints two adjoining splint-engaging bars made hollow and with rounded faces to engage the splints, one of such bars being corrugated to form grooves to receive and inclose portions of the splints, in combination with means for connecting the bars together, so that one can move with reference to the other on an arc of a circle concentric with the curvature of the rounded surface of such bar, substantially as and for the purpose shown.

In testimony that I claim the foregoing I have hereunto set my hand this 6th day of June, A. D. 1895.

PHILIP G. RUSSELL.

Witnesses:
HENRY C. HAZARD,
E. L. WHITE.